United States Patent
Gutowski et al.

(10) Patent No.: US 9,157,475 B2
(45) Date of Patent: Oct. 13, 2015

(54) SELF-ALIGNING MAINTENANCE FREE BEARING UNIT FOR AGRICULTURAL APPLICATIONS

(75) Inventors: Jordan Eric Gutowski, Vernon Hills, IL (US); Stefano Urso, Lake Bluff, IL (US); Victor Manuel Marban, Buffalo Grove, IL (US); Joaquin Gutierrez, Waukegan, IL (US); Louis John Lenick, Mount Prospect, IL (US); Xinying Fan, Xinchang (CN); Brian Alan Cohen, Wilmette, IL (US); Daniel Nicholas Mazzarella, Gurnee, IL (US); Feng Zhao, Xinchang (CN)

(73) Assignee: Peer Bearing Company, Waukegan, IL (US)

( * ) Notice: Subject to any disclaimer, the term of this patent is extended or adjusted under 35 U.S.C. 154(b) by 1104 days.

(21) Appl. No.: 12/832,660

(22) Filed: Jul. 8, 2010

(65) Prior Publication Data

US 2011/0019952 A1    Jan. 27, 2011

Related U.S. Application Data

(60) Provisional application No. 61/223,950, filed on Jul. 8, 2009.

(51) Int. Cl.
 *F16C 33/78* (2006.01)
 *F16C 23/08* (2006.01)

(52) U.S. Cl.
 CPC ........... *F16C 23/084* (2013.01); *F16C 33/7866* (2013.01); *F16C 33/7889* (2013.01); *F16C 33/7896* (2013.01); *F16C 2310/00* (2013.01)

(58) Field of Classification Search
 CPC .. F16J 15/3232; F16J 15/002; B60B 27/0073; B60B 27/0005
 USPC .......... 384/477, 484–486; 277/500, 543, 353, 277/349, 402
 See application file for complete search history.

(56) References Cited

U.S. PATENT DOCUMENTS

| | | | |
|---|---|---|---|
| 3,311,429 A | | 3/1967 | Kocian |
| 3,314,735 A | * | 4/1967 | Kocian .......................... 384/475 |
| 4,726,696 A | | 2/1988 | Dickinson et al. |
| 4,792,242 A | * | 12/1988 | Colanzi et al. ................ 384/482 |
| 5,011,301 A | | 4/1991 | Martinie |

(Continued)

OTHER PUBLICATIONS

PCT/US2010/041402 Search Report and Written Opinion dated Sep. 1, 2010.

*Primary Examiner* — Thomas R. Hannon
(74) *Attorney, Agent, or Firm* — Cool Alex Ltd.

(57) ABSTRACT

A contamination-resistant bearing assembly includes an outer ring mounted within a housing and an inner ring rotatably supported from the outer ring. Inboard and outboard seal structures are disposed within a bearing space defined between the rings and prevent contaminants from entering a rolling element lubrication zone. A surface seal may also be included to protect the spherical interface between the housing and outer ring. The improved structure allows dynamic alignment of the bearing assembly when acted on by outside forces and also allows for extended operation under maintenance free conditions with no need for relubrication.

6 Claims, 9 Drawing Sheets

(56) References Cited

U.S. PATENT DOCUMENTS

| | | | |
|---|---|---|---|
| 5,042,822 A * | 8/1991 | Dreschmann et al. | 277/353 |
| 5,927,867 A | 7/1999 | Niebling et al. | |
| 7,258,491 B2 | 8/2007 | Gutowski et al. | |
| 7,591,593 B2 | 9/2009 | Tsujimoto | |
| 2003/0156772 A1 * | 8/2003 | Yamashita et al. | 384/486 |
| 2005/0238271 A1 | 10/2005 | Schafer et al. | |
| 2006/0177167 A1 * | 8/2006 | Tsujimoto | 384/486 |
| 2006/0274984 A1 * | 12/2006 | Gutowski et al. | 384/486 |

* cited by examiner

SELF-ALIGNING MAINTENANCE FREE BEARING UNIT FOR AGRICULTURAL APPLICATIONS

CROSS REFERENCE TO RELATED APPLICATION

This application claims the benefit of U.S. Provisional Application No. 61/223,950 filed Jul. 8, 2009 which is incorporated herein by reference in its entirety.

BACKGROUND

The present disclosure relates generally to a bearing assembly and, more specifically, to a contamination-resistant bearing assembly having a multi-part sealing structure particularly useful in harsh environmental conditions such as agricultural tillage applications.

Contamination problems are particularly apparent in agricultural tillage implement bearings because such bearings operate in wet and muddy soil conditions and therefore are exposed to contaminants such as dirt, mud and water. Extended bearing usage in such environments often allows dirt and mud to accumulate and pack against the sealing structure and lead to contaminant ingress into the bearing space and eventually lead to bearing failure. Oftentimes, several times a year such bearings may be exposed to high pressure washing and during such cleaning process contaminants are often forced into the bearing space. Once a bearing is contaminated, the bearing will eventually seize and fail to turn or become loose due to wear and corrosion.

Typically, the life of bearings used in these harsh environments is sustained through frequent and plentiful relubrication to purge the bearing assembly of contaminants and avoid corrosion of the bearing space and rolling surfaces. However, maintenance-free bearings cannot be easily lubricated, and therefore the foreign material typically cannot be flushed away.

Bearing assemblies used in agricultural tillage implements also have to allow for dynamic misalignment to accommodate deflections encountered during the tillage operation. The inability of a bearing assembly to misalign results in high internal stresses which lead to accelerated bearing failure. Current assemblies allow misalignment wear in key areas resulting in bearing damage after extended operation.

Development of a self-aligning maintenance free unit saves the time and expense of relubrication as well as reduces environmental contamination caused by purging grease during relubrication.

SUMMARY

It is an objective of the present disclosure to provide an improved, self-aligning maintenance free bearing unit that overcomes the previously stated problems and offers extended bearing life without the maintenance of frequent relubrication. This is accomplished with the design of the rugged sealing system for both the bearing and the self-aligning spherical interface as well as an integrated housing and an anti-rotation system.

Another objective of the present invention is to provide an improved, self-aligning maintenance free bearing unit that optimizes performance with potentially three different lubrication zones for lubrication of independent functions. The three lubrication zones provide (1) lubrication of the rolling surfaces as well as contaminant exclusion of the bearing space, (2) lubrication of the seal structures as well as creating a grease seal, and (3) lubrication of the self-aligning spherical interface.

These and other objectives are realized by a bearing assembly having a housing with an outer ring mounted at least partially within the housing. The outer ring has a generally spherical outer surface and a sliding surface on the inner diameter of the outer ring. An inner ring is mounted at least partially within the outer ring. The inner ring has a sliding surface on the outer diameter thereof. A bearing space is defined between the inner and outer rings. A plurality of rolling elements are disposed within the bearing space and support the inner ring for rotation about an axis. An inboard seal structure is supported within the bearing space. The inboard seal structure includes a first washer fixed to one of the inner or outer rings. The inboard seal structure also includes a first sealing member mounted to the first washer. The first sealing member is in sliding contact with the sliding surface of the other of the inner or outer rings. An outboard seal structure is supported within the bearing space adjacent to and axially outwardly from the inboard seal structure. The outboard seal structure includes a second washer fixed to other of the inner or outer rings and a second sealing member mounted to the second washer. The second sealing member is in sliding contact with the sliding surface of the one of the inner or outer rings. The bearing assembly may further include at least one surface seal positioned between the housing and the spherical outward surface of the outer ring. In another embodiment the bearing assembly has at least one protective shroud supported from the one of the inner or outer rings and positioned axially outwardly from the outboard seal structure.

DETAILED DESCRIPTION OF THE DISCLOSURE

Figure 1:
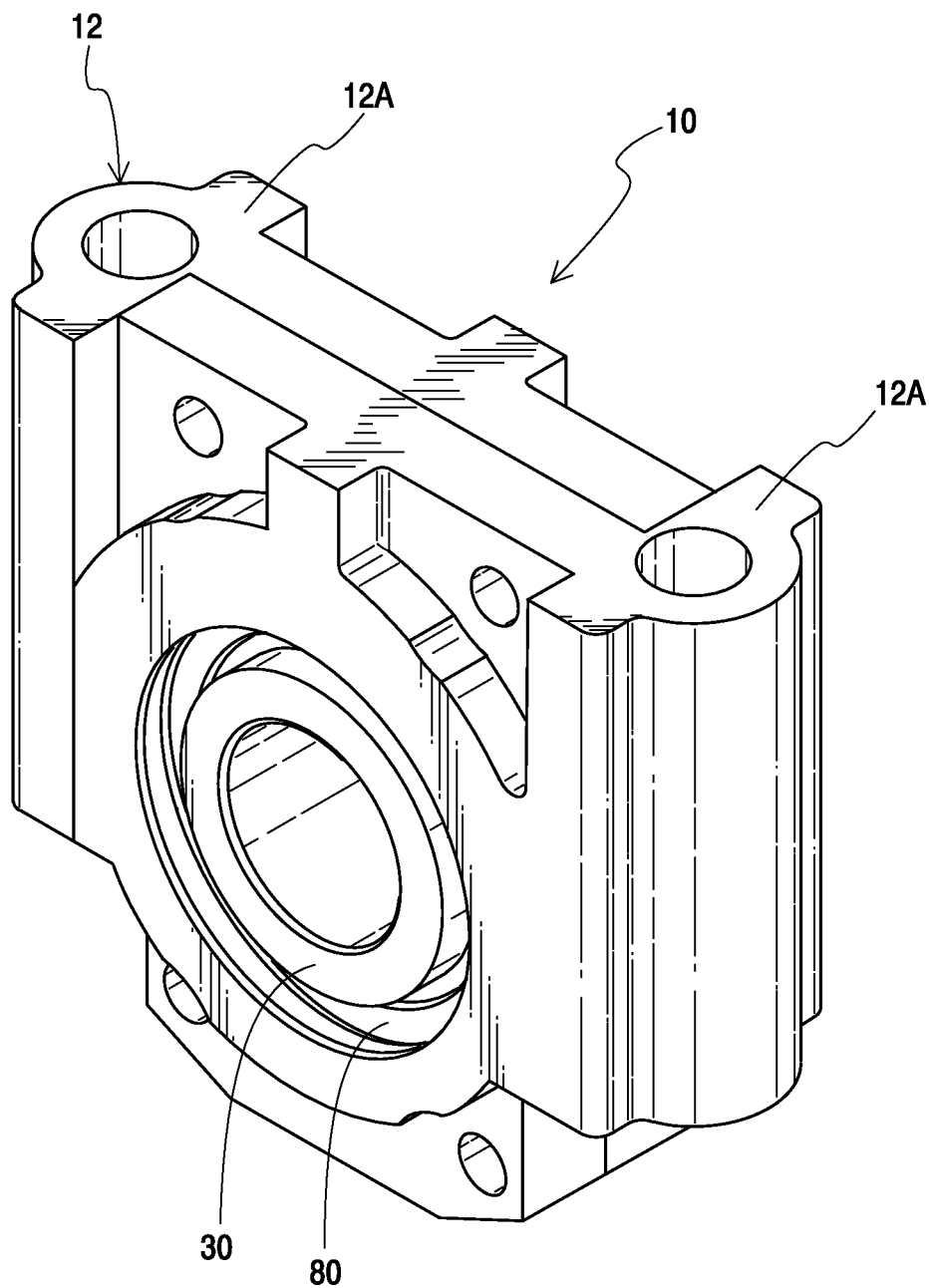
FIG. 1 is a perspective view of one embodiment of a bearing assembly.
Figure 2:
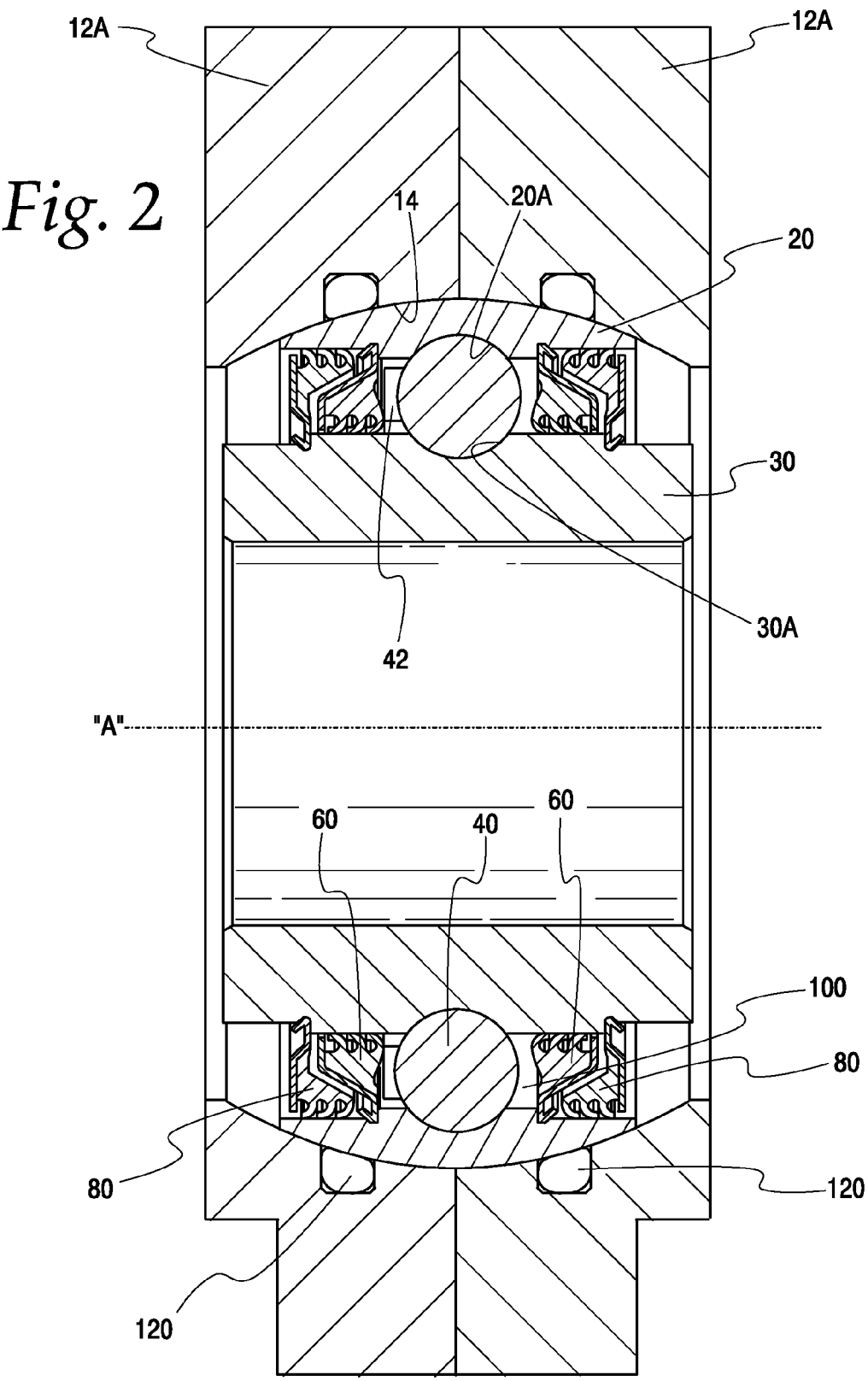
FIG. 2 is a cross sectional view of the bearing assembly of FIG. 1.
Figure 3:
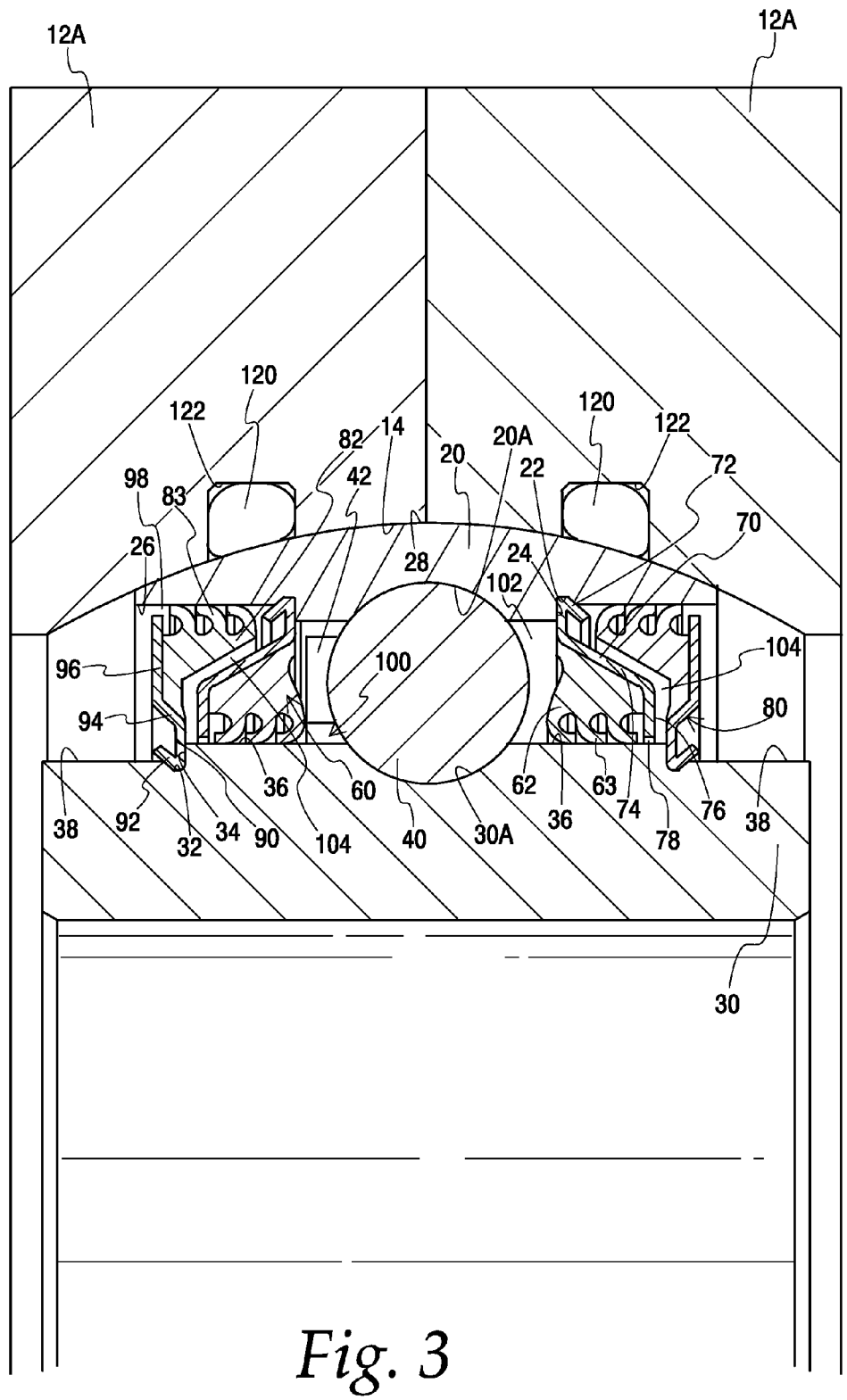
FIG. 3 is an enlarged cross sectional view of the bearing assembly of FIG. 1.

FIGS. 1-3 illustrate one embodiment of a contamination-resistant bearing assembly 10 of the present disclosure adapted for receiving a shaft (not shown) for rotation about an axis "A". The shaft may be part of an agricultural implement, e.g., a disk gang axle supporting disk blades (not shown) for rotation in the soil. However, it will be understood that the disclosed bearing assembly of the present invention could be used in any high-contamination environment and is not limited to use with agricultural implements.

The bearing assembly 10 includes an outer ring 20 non-rotatably supported in a housing 12 such as a disk standard, pillow block or other suitable mounting. An inner ring 30 is rotatably mounted by rolling elements 40 such as hardened steel balls or rollers. It will be appreciated that any number of different rolling elements may be used with the bearing assembly of the present disclosure, including needle rollers, spherical balls and rollers, tapered rollers, and offset rollers. The shaft (not shown) may be secured to the inner ring 30 for rotation about the axis "A" using any suitable means of attachment.

The surface at the inner diameter of the outer ring 20 includes a central raceway 20a. Located axially outboard of the raceway are outwardly-facing, radial walls or steps 24, one on either side of the raceway 20a. Each wall partially defines an annular groove 22. Further axially outboard of the grooves 22 are sliding surfaces 26. The outer ring also has a spherical outer surface 28.

The surface of the outer diameter of the inner ring 30 has features similar to those of the outer ring's internal surface but with the axial positions of the grooves and sliding surfaces reversed. Thus, there is a central raceway 30a bounded on either side by a sliding surface 36 which terminates at an outwardly-facing, radial walls or steps 34. The walls 34 partially define an annular groove 32. Outboard of the groove 32 is a annular ledge 38.

As best illustrated in FIG. 3, the outer ring 20 and inner ring 30 define a bearing space 100 therebetween which includes a rolling element lubrication zone 102. In the illustrated embodiment rolling elements in the form of steel balls 40 are disposed in the rolling element lubrication zone 102 in contact with the raceways 20a and 30a. A retainer or cage 42 engages the balls 40 and retains them in the rolling element lubrication zone 102. In addition, an inboard seal structure 60 and an outboard seal structure 80 are disposed in the bearing space 100 and seal the rolling element lubrication zone 102 to prevent contaminants from entering the zone 102. The seal structures 60, 80 resist external forces exerted by freezing material or dirt packed on the shaft that could otherwise compromise the blocking characteristics of the seal structures. The inboard and outboard seal structures 60 and 80 are provided on both sides of the rolling element lubrication zone 102 with the inboard seal structure 60 axially closer to the rolling elements 40 than the outboard seal structure 80.

Details of the inboard seal structure 60 are shown in FIG. 3. It includes a sealing member 62 engaged with a steel washer 70. The steel washer has an outer edge 72 that is fixed to the outer ring 20. Preferably the outer edge 72 is fixed to the outer ring by mechanically stamping, crimping or rolling it into the groove 22 of the outer ring 20. A die may be used to crimp the edge 72 into the groove 22. As used herein a washer edge that has been mechanically stamped, crimped or rolled into the groove will be referred to as an anchored edge. The anchored edge forecloses any possibility of contaminants penetrating between the outer edge 72 and the outer ring 20. While anchoring the washer to the ring is the preferred method of fixing the washer to the ring, other methods of fixing the washer to the ring could alternately be used, such as an interference fit.

The washer 70 abuts the outwardly facing wall 24 of the outer ring 20 to prevent the inboard seal structure 60 from moving axially inwardly from the position shown. The washer 70 extends radially inwardly from the crimped outer edge 72 to an axially outwardly angled or diagonal portion 74. A radial inner end portion 76 of the washer 70 extends from the angled portion 74 toward the inner ring 30. A close clearance labyrinth gap 78 is defined between the end portion 76 and the sliding surface 36 of the inner ring 30.

In the illustrated embodiment, the sealing member 62 is a triple-lip sealing member made of rubber such as nitrile rubber or fluororubber; however, it will be understood that other sealing members and materials may be used. The sealing member 62 is secured to at least the inwardly directed face of the angled portion 74 of the washer 70. Lips 63 extend radially inwardly at the base of the sealing member 62 and bend axially outwardly toward the end portion 76 of the washer 70. The lips 63 are in slidable radial contact with the sliding surface 36 of the inner ring 30. With this arrangement, together the two inboard seal structures 60 isolate the rolling element lubrication zone 102 of the bearing space 100, preventing entry of contaminants into the zone and preventing lubrication such as grease from exiting the zone.

The outboard seal structure 80 is similar to the inboard seal structure 60. The outboard seal structure 80 includes a sealing member 82 and a steel washer 90. However, instead of being fixed to the outer ring 20, an inner edge 92 of the steel washer 90 is mechanically stamped, crimped or rolled into the groove 32 of the inner ring 30. As is the case with the crimped connection of the outer edge 72 to the outer ring, the crimping of the inner edger 92 to the inner ring 30 prevents any contaminants from penetrating between the washer 90 and the inner ring. It will be understood that the orientation of the two seal structures could be flipped from that shown, i.e, the inboard seal structure 60 could be crimped into the inner ring and the outboard seal structure 80 could be crimped into the outer ring. The inner edge 92 of the washer 90 abuts the outwardly facing wall 34 of the inner ring 30 to prevent the outboard seal structure 80 from moving axially inwardly from the position shown. This enables the washer to withstand the pressure of soil on the bearing as the bearing is dragged through the ground. The washer 90 extends radially outwardly from the crimped inner edge 92 to an axially outwardly angled or diagonal portion 94. A radial outer end portion 96 of the washer 90 extends from the angled portion 94 toward the outer ring 20. A close clearance labyrinth gap 98 is defined between the end portion 96 and the sliding surface 26 of the outer ring 20.

In the illustrated embodiment, the sealing member 82 is a triple-lip sealing member made of rubber such as nitrile rubber or fluororubber. Again, it will be appreciated that other sealing members and materials may be used. The sealing member 82 is secured to at least the inwardly directed face of the end portion 96 of the washer 90. Lips 83 extend initially radially outwardly at the base of the sealing member 82 and then bend axially outwardly toward the end portion 96 of the washer 90. The lips 83 are in slidable radial contact with the sliding surface 26 of the outer ring 20. The outboard seal structures 80 prevent the entrance of coarse contaminants such as dirt, mud, stones and other debris into the bearing space 100.

A seal lubrication zone 104 is defined in the bearing space 100 between the inboard and outboard seal structures 60 and 80. A lubrication material such as grease is placed within this seal lubrication zone 104 and provides lubrication to lips 63 and 83 of the sealing members 62 and 82. In addition, the sealing members retain the lubrication within the seal lubrication zone 104 and therefore, the lubrication creates a grease pack seal and provides an additional contamination barrier for any contaminants that may infiltrate the bearing space through the labyrinth gap 98 and past the lips 83 of the second seal structure 80.

In addition, when the bearing assembly is under centrifugal force, the lubrication sealed within the seal lubrication zone 104 will move toward the outboard seal structure 80 and provide sufficient lubrication to lips 83 and sliding surface 26 of the outer ring 20. This significantly reduces the resistance and thereby stabilizes torque at a low level.

The compact arrangement of the seal structures is such that contaminants must pass through a difficult, winding pathway before they can approach the lubrication zone 102. More specifically, contaminants are prevented from penetrating between the outboard seal 80 and the inner ring 30 by the crimped connection of the washer's inner end 92 and the inner ring. Thus, the only possible path to the interior cavity of the bearing is through labyrinth gap 98 at the outer ring and past the lips 83 of the outboard seal structure 80. If a contaminant were to make it past the lips 83 it would immediately be confronted with the crimped connection of the inboard seal's washer 70 to the outer ring 20. There is no getting past that connection. The only possibility is to head for the inner ring 30. Then, the opposite orientation of the inboard and outboard seal structures requires the contaminants to move back, i.e., axially outwardly and radially inwardly, through the seal lubrication zone 104, which itself is filled with grease. Finally, any entering contaminant would have to pass through labyrinth gap 78 at the inner ring and past the lips 63 of the inboard seal structure 60. This compact and winding arrangement of the seal structures creates a difficult passageway for the contaminants to actually enter the rolling element lubrication zone 102 where they might otherwise impact the life of the bearing assembly. The crimping of one seal structure to the inner ring and the crimping of the other seal structure to the outer ring It is also pointed out that the somewhat triangular shapes of the sealing members of the inboard and outboard seal structures allow them to be nested together such that they are radially stacked. That is, the seal structures overlap one another in a radial plane. At least a portion of the contact zone between the inboard sealing member 62 and the sliding surface 36 is radially aligned with the contact zone between the outboard sealing member 82 and the sliding surface 26. This affords a compact assembly that minimizes the width of the bearing assembly. It effectively doubles the number of lips of a standard three-lip seal in only 1.3 times the width of the standard seal. This allows use of a much more robust seal assembly in a space designed for conventional seals, which means existing equipment can be retrofit with the seal of the present invention.

As mentioned previously, the inner and outer rings are supported in a housing 12. In the embodiment illustrated in FIGS. 1-3, the housing includes two symmetrical halves 12a; however it is appreciated that other shapes or configurations of the housing may be implemented. The housing has a generally spherical inner surface 14 which interacts with the spherical outer surface 28 of the outer ring 20. The interaction between inner surface 14 and outer surface 28 allows optimized stress distribution as well as provides a scraping function to clean the surfaces of contaminants during misalignment.

The bearing assembly optionally includes an anti-rotation system to prohibit circumferential rotation of the outer ring of the ball bearing assembly. The anti-rotation system includes at least one surface seal. The surface seals also allow static and dynamic alignment of the ball bearing assembly within the housing and protect the spherical interface from contaminants.

In the embodiment illustrated in FIGS. 1-3, a spherical surface seal 120 is mounted from the inside of each housing half 12a. The surface seal 120 fits in a groove 122 in each housing half 12a. The surface seal may be a lip seal, o-ring or any other suitable sealing member. Alternatively, the surface seal may include a sealing member mounted to a steel washer. When assembled, the surface seal is pressed against the outer surface of the outer ring 20 and helps resist circumferential rotation of the outer ring. Surface seals 120 also retain lubricant placed at the interface of spherical surfaces 14 and 28.

Figure 4:
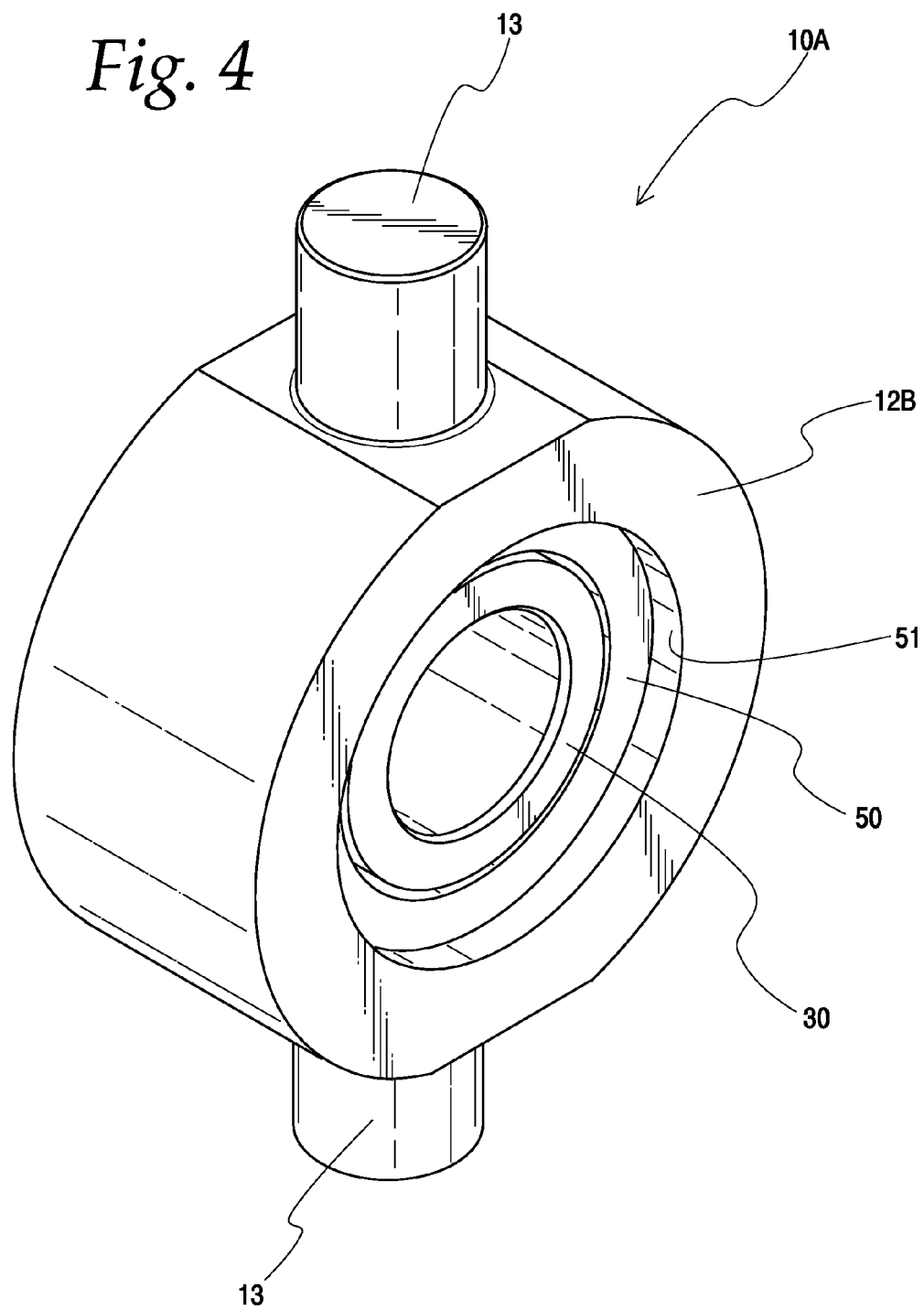
FIG. 4 is a perspective view of another embodiment of a bearing assembly.
Figure 5:
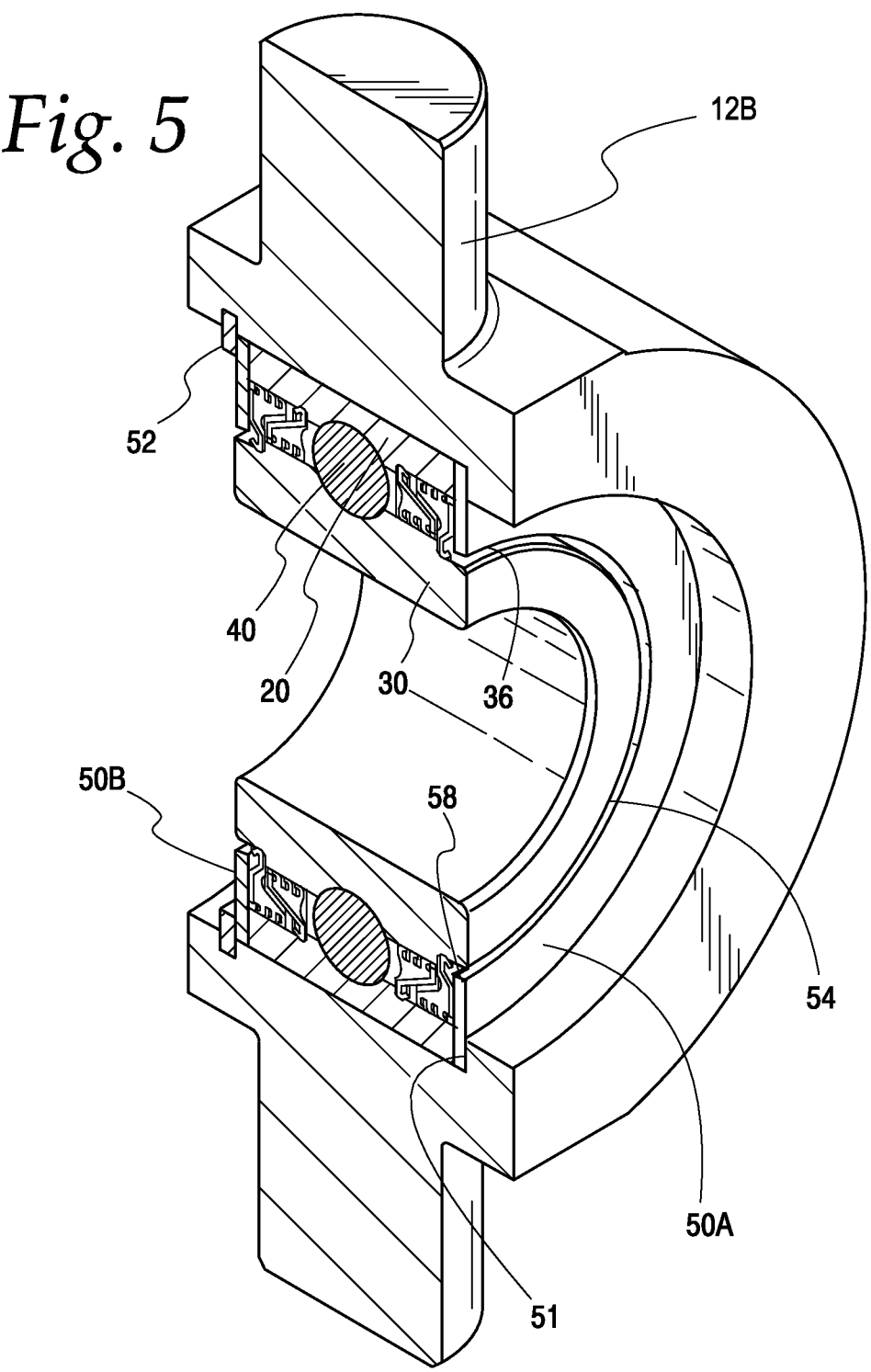
FIG. 5 is a cross sectional perspective view of the bearing assembly of FIG. 4.
Figure 6:
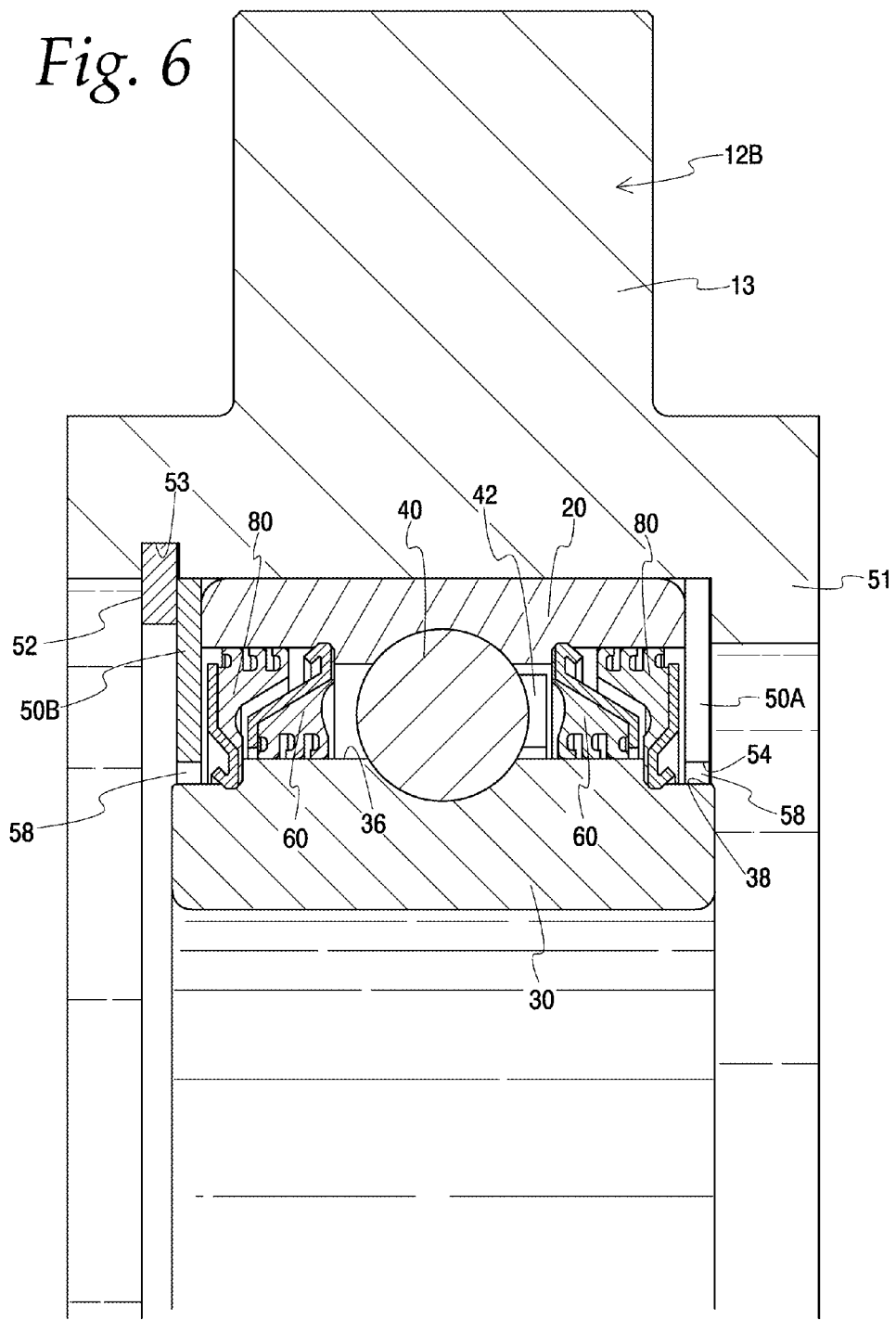
FIG. 6 is a cross sectional view of the bearing assembly of FIG. 4.

FIGS. 4-6 illustrate another embodiment of self-aligning maintenance free bearing assembly 10a which is similar to the bearing assembly of FIGS. 1-3. Similar or identical elements will be referred to with the same reference numerals as above. In this embodiment, the housing 12b has a one-piece construction which includes posts 13. The posts can be mounted for rotation in the implement on which the bearings are used to accommodate misalignment in the shaft. This makes it unnecessary to utilize the spherical surfaces on the interior of the housing and the exterior of the outer ring.

The bearing assembly 10a further includes protective shrouds 50a, 50b which provide resistance against coarse contamination such as dirt, mud, stones and wrapping debris from entering the bearing space through the inboard and outboard seal structures 60 and 80. More specifically, the housing 12b defines a shoulder 51 against which shroud 50a abuts. The shroud 50a is held against the shoulder 51 by the outer ring 20 of the bearing. A third close clearance labyrinth gap 58 is defined between the inner diameter 54 of the shroud and the annular ledge 38 of the inner ring 30. The second shroud 50b is fixed against the opposite side of the outer ring 20 by a snap ring 52. The outer diameter of the snap ring 52 fits into a groove 53 formed in the housing 12b. The shrouds provide high resistance to the pressure of soil as the bearing is dragged through the ground.

The protective shrouds 50a, 50b create a further obstacle to the already winding passageway for a contaminant to enter the rolling element lubrication zone 102. The only possible entry path is through the shroud gap 58 at the inner ring, then back out radially to the outer ring, then axially through the outboard seal gap 98 at the outer ring and past the lips 83, then through the zone 104 and radially back to the inner ring and then axially through the inboard seal gap 78 and past the lips 63. There is little chance that any contamination will be able to negotiate this labyrinthine path.

Figure 7:
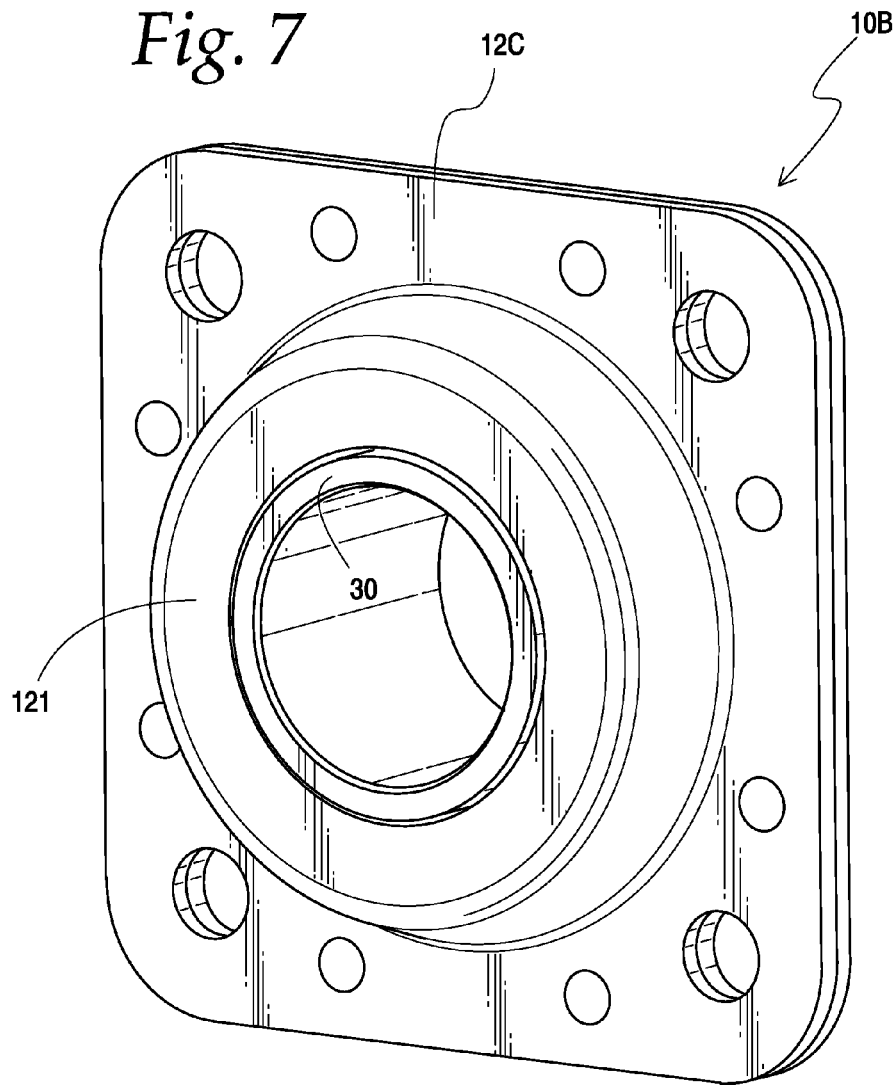
FIG. 7 is a perspective view of yet another embodiment of a bearing assembly.
Figure 8:
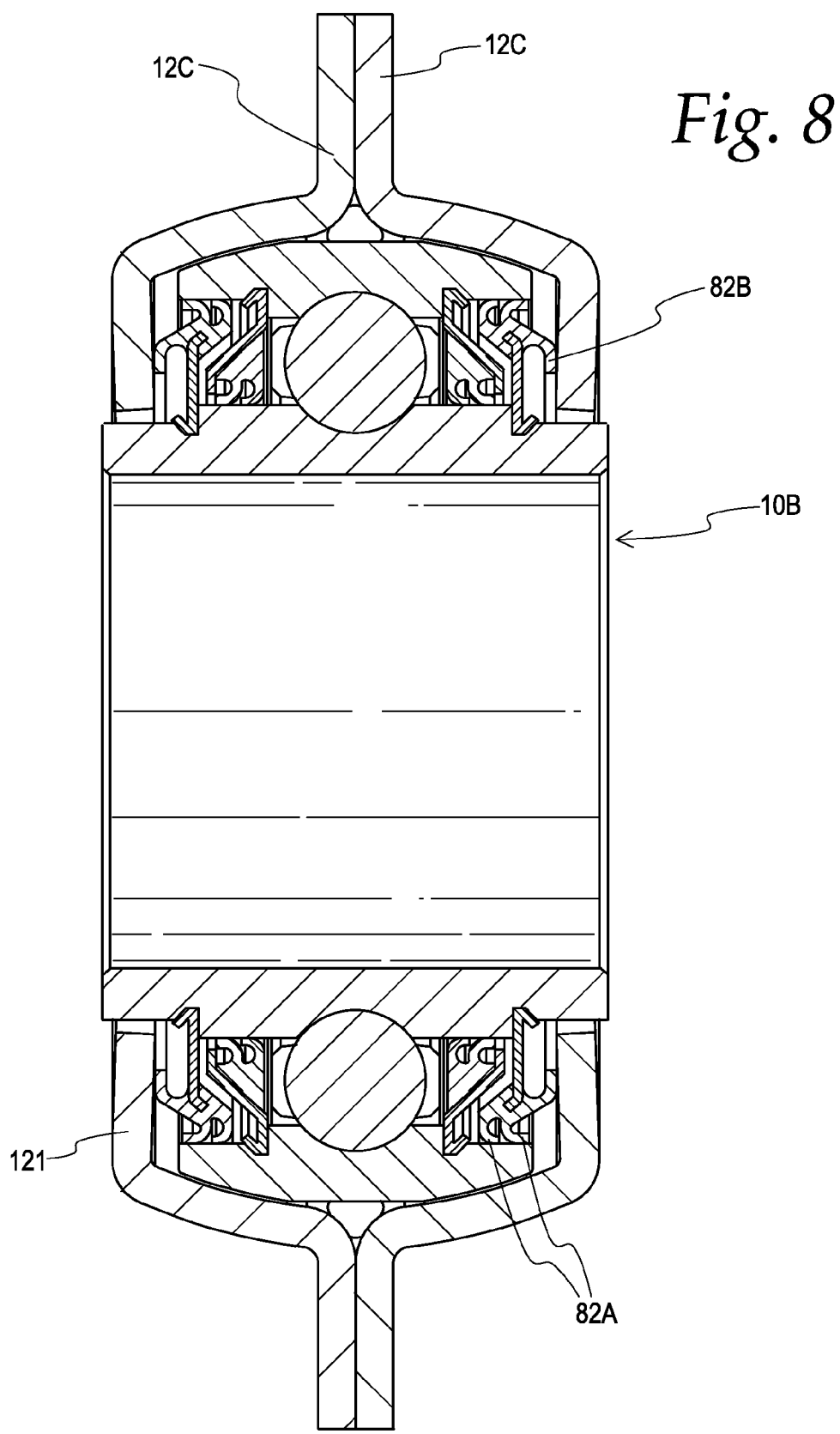
FIG. 8 is a cross sectional view of the bearing assembly of FIG. 7.

FIGS. 7-8 illustrate an additional embodiment 10b which includes an alternative anti-rotation system. This embodiment includes a surface seal 120a which may be an o-ring inserted between the housing halves 12c. As best shown in FIG. 8, the housing halves 12c include chamfers or radiused corners which are in contact with the surface seal 120a to create a force that crimps the o-ring, thereby creating a radial force on the outer ring 20. In addition, the o-ring 120a seals the mating surfaces of the housing halves 12c from ingress of water or other contaminants.

Also, in this embodiment, the outboard seal structure 80 and more specifically its sealing member includes at least one lip 82b which is in slidable radial contact with an interior surface of an inwardly-extending wall 121 of the housing half 12c. Together, lip 82b along with lips 82a which are in contact with sliding surface 26 of the outer ring 20 help prevent contaminants from further entering the bearing assembly.

Figure 9:
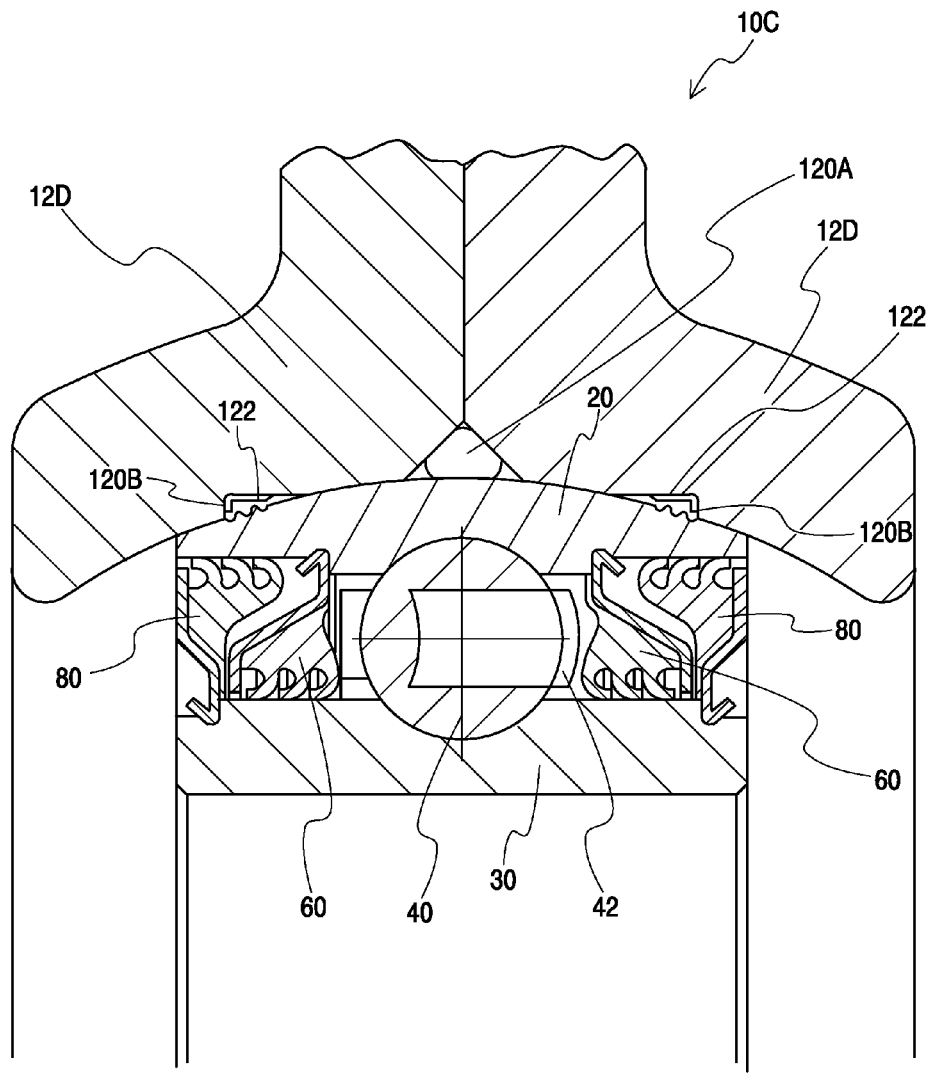
FIG. 9 is a cross sectional view of a further alternate embodiment of a bearing assembly.

In an additional embodiment shown at 10c in FIG. 9, the o-ring 120a between the housing halves 12d may be combined with the spherical surface seals 120b, each of which is restrained by a radial interference fit in a groove 122 in each housing half 12d.

As best shown in FIG. 9, the housing halves 12d include chamfers which are in contact with the o-ring create a force that crimps the o-ring 120a creating a force onto the outer ring 20. This force in combination with that of the spherical surface seals 120*b* resists circumferential rotation of the outer ring 20. In addition, the mating surfaces of the housing halves 12*d* are sealed from water ingress via the o-ring 120*a*. The spherical interface is an independent lubrication zone and allows the bearing outer ring 20 to self-align within the housing 12.

As can be seen from the above description, the present invention provides numerous benefits to the end user and agricultural implement manufacturer including, but not necessarily limited to: a) eliminating relubrication of bearing units; b) reduced assembly cost due to elimination of provisions for relubrication; c) environmental care—no grease discharge into ground during relubrication; d) reduced assembly cost by the use of an integrated bearing and housing solution; and e) elimination of downtime during tillage season. The invention has several different aspects, which are not limited to the specific structures shown in the attached drawings and which do not necessarily need to be used together. Variations of these concepts or structures may be embodied in other structures without departing from the present invention.

We claim:

1. A bearing assembly comprising:
   a housing;
   an outer ring mounted at least partially within the housing and having an outer surface and a sliding surface on the inner diameter of the outer ring;
   an inner ring mounted at least partially within the outer ring and having a sliding surface on the outer diameter thereof, the inner and outer rings defining a bearing space between them;
   a plurality of rolling elements disposed within the bearing space and supporting the inner ring for rotation about an axis;
   an inboard seal structure supported within the bearing space, the inboard seal structure including a first washer anchored to one of the inner or outer rings and a first sealing member mounted to the washer, wherein the first sealing member is in sliding contact with the sliding surface of the other of the inner or outer rings; and
   an outboard seal structure supported within the bearing space adjacent to and axially outwardly from the inboard seal structure, the outboard seal structure including a second washer anchored to the other of the inner or outer rings and a second sealing member mounted to the second washer, wherein the second sealing member is in sliding contact with the sliding surface of the one of the inner or outer rings; and
   wherein the first and second sealing members are each multi-lip seals that are nested together such that the axially outermost lip of the first sealing member is located axially outward of axially innermost lip of the second sealing member.

2. The bearing assembly of claim 1 wherein the first washer and second sealing member of the inboard and outboard seal structures cooperate to define a seal lubrication zone which at least in part extends within the bearing space.

3. The bearing assembly of claim 2 wherein the first washer is secured in a stepped portion of one of the inner or outer rings, the first washer having an angled portion extending into the bearing space, and the outboard seal structure is positioned in the bearing space such that an angled portion of the second sealing member cooperates with the angled portion of the first washer to define the seal lubrication zone.

4. The bearing assembly of claim 1 wherein the multi-lip seals include flexible lips having ends flexed axially outwardly against the rings.

5. The bearing assembly of claim 2 wherein the at least one surface seal is positioned within a groove in the housing and against the outer surface of the outer ring.

6. A bearing assembly comprising:
   a housing;
   an outer ring mounted at least partially within the housing and having an outer surface and a sliding surface on the inner diameter of the outer ring;
   an inner ring mounted at least partially within the outer ring and having a sliding surface on the outer diameter thereof, the inner and outer rings defining a bearing space between them;
   a plurality of rolling elements disposed within the bearing space and supporting the inner ring for rotation about an axis;
   an inboard seal structure supported within the bearing space, the inboard seal structure including a first washer fixed to one of the inner or outer rings and a first sealing member mounted to the first washer, wherein the first sealing member is in sliding contact with the sliding surface of the other of the inner or outer rings; and
   an outboard seal structure supported within the bearing space adjacent to and axially outwardly from the inboard seal structure, the outboard seal structure including a second washer fixed to the other of the inner or outer rings and a second sealing member mounted to the second washer, wherein the second sealing member is in sliding contact with the sliding surface of the one of the inner or outer rings, at least a portion of the contact zone between the first sealing member and the sliding surface of the other of the inner or outer rings is radially aligned with at least a portion of the contact zone between the second sealing member and the sliding surface of the one of the inner or outer rings;
   and wherein one of the first and second washers has a diagonal portion, at least a portion of which is radially aligned with the radially aligned portions of said contact zones between the sealing members and the sliding surfaces.

\* \* \* \* \*